J. G. SCHNEIDER.
NUT LOCK.
APPLICATION FILED JAN. 27, 1914.
1,103,847.
Patented July 14, 1914.
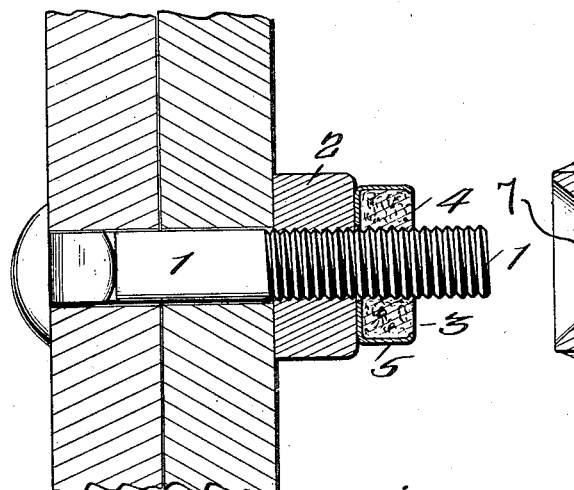
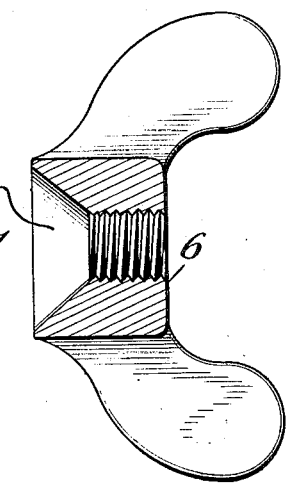
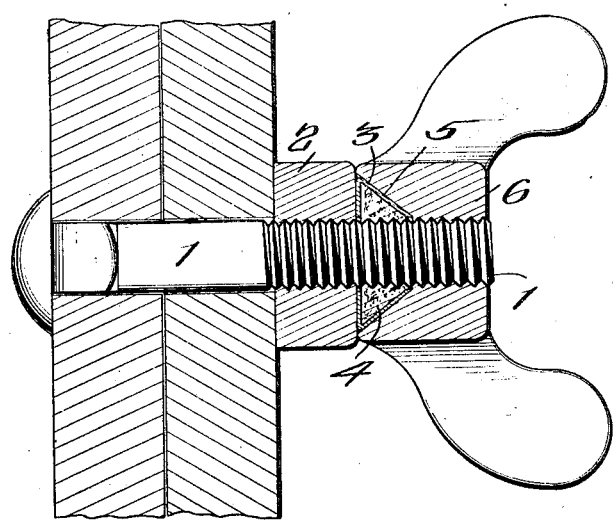
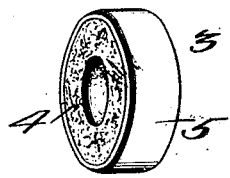
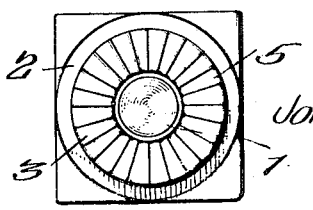
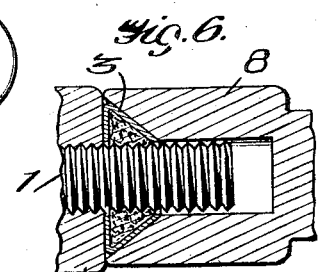
INVENTOR
JOHN G. SCHNEIDER,
BY Munn & Co.
ATTORNEYS
WITNESSES

UNITED STATES PATENT OFFICE.

JOHN GEORGE SCHNEIDER, OF YORK, PENNSYLVANIA, ASSIGNOR OF ONE-THIRD TO CHARLES A. HAWKINS, OF YORK, PENNSYLVANIA.

NUT-LOCK.

1,103,847. Specification of Letters Patent. Patented July 14, 1914.

Application filed January 27, 1914. Serial No. 814,652.

*To all whom it may concern:*

Be it known that I, JOHN GEORGE SCHNEIDER, a citizen of the United States, and a resident of York, in the county of York and State of Pennsylvania, have made an Improvement in Nut-Locks, of which the following is a specification.

My invention is embodied in a jam or locking nut having a body formed of a soft elastic material such as cork, and an inclosing casing of thin sheet metal, both of which are compressed into conical form engaging the thread of the bolt to which the main nut is applied.

The invention is particularly adapted for use in securing fish plates to railway rails, but is of course capable of general application.

In the accompanying drawing, Figure 1 is a sectional view showing the compressible clamping nut applied to a screw-bolt for locking the main or primary nut thereon. Fig. 2 is a sectional view of a hand device that may be employed in compressing the locking nut upon the bolt. Fig. 3 is a sectional view supplementary to Fig. 1, and showing the compressing device applied and the clamping nut compressed into its permanent conical form. Fig. 4 is a perspective view of a clamping nut prior to compression. Fig. 5 is a face view including the end of the bolt, the face of the clamping nut and a portion of the main nut. Fig. 6 is a sectional view illustrating a modification of the device for compressing the clamping nut by percussion.

In the drawing, the numeral 1 indicates a screw-bolt, 2 the main or primary nut screwed thereon, and 3, the compressible elastic clamping nut. The latter—see Fig. 4—is formed of a circular body 4 and a metal casing 5. The body has flat parallel faces and a central hole which is large enough to receive the bolt 2. The body is formed of some elastic compressible material such, for example, as cork, soft rubber or fiber and the casing is made of some thin flexible metal, aluminum being preferred on account of its slight susceptibility to oxidation.

The hand-tool 6 used for compressing the locking nut comprises a wing nut provided with a conical recess 7 in its inner side or face.

In practical application of the invention, the main nut 2 having been screwed home on bolt 1, the clamping nut 3 is applied and pushed back on the bolt into contact with the face or outer side of the main nut 2, as shown in Fig. 1. The compression tool 6 is then applied by screwing it on the bolt whereby its conical recess receives the outer portion of the clamping nut and serves to compress and shape the latter into conical form, as shown in Fig. 3. In this operation it is apparent that the elastic body is forced into the thread of the bolt, thus practically converting it from a mere washer into a nut which grips the bolt elastically. In other words, the clamping nut is caused to grasp the bolt so firmly that it retains its position and thus locks the main nut so as to effectually prevent it becoming loosened or detached by the jarring incident to use, particularly in railway construction.

It is apparent that the compression produced by means of the hand-tool shown in Fig. 2, is due to its travel along the bolt, which is effected by rotation. In many cases, however, it may be preferred to effect this compression of the clamping nut by percussion, and for this purpose I employ a tool 8, a portion of which is illustrated in Fig. 6.

The head of this tool has a conical recess like the hand-tool shown in Fig. 2, and acts very effectively in shaping and compressing the clamping nut. It obviously has less friction with the nut since it is not rotated thereon. It will be understood that the outer end of this tool is suitably constructed to receive the blows of a hammer by which it is driven forcibly into contact with the clamping nut.

What I claim is:

The combination with a threaded bolt and an ordinary nut applied thereto, of a locking nut applied against the outer face of the ordinary nut and composed of a circular body of elastic material, and a compressible casing of thin metal which incloses the cork body, the face portion of the latter being compressed into the thread of the bolt, and the sheet metal retaining the cork in such engagement, as described.

JOHN GEORGE SCHNEIDER.

Witnesses:
SOLON C. KEMON,
AMOS W. HART.